(12) United States Patent
Hindi et al.

(10) Patent No.: US 7,274,020 B1
(45) Date of Patent: Sep. 25, 2007

(54) GAMMA VECTOR CAMERA

(75) Inventors: Munther M. Hindi, Campbell, CA (US); Lee M. Klynn, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 234 days.

(21) Appl. No.: 10/866,760

(22) Filed: Jun. 15, 2004

Related U.S. Application Data

(60) Provisional application No. 60/484,850, filed on Jul. 3, 2003.

(51) Int. Cl.
*G01T 1/20* (2006.01)
*G01T 1/24* (2006.01)

(52) U.S. Cl. .............................. 250/363.01; 250/370.09

(58) Field of Classification Search ........... 250/363.01, 250/363.04, 366, 367, 369, 370.08, 370.09, 250/307
See application file for complete search history.

(56) References Cited

U.S. PATENT DOCUMENTS

| | | | |
|---|---|---|---|
| 5,665,971 A * | 9/1997 | Chen et al. ............... | 250/385.1 |
| 5,821,541 A * | 10/1998 | Tumer .................... | 250/370.09 |
| 5,943,388 A * | 8/1999 | Tumer ........................ | 378/98.9 |
| 6,420,711 B2 * | 7/2002 | Tumer .................... | 250/370.09 |
| 6,484,051 B1 * | 11/2002 | Daniel ........................ | 600/436 |
| 6,693,291 B2 * | 2/2004 | Nelson et al. ............ | 250/505.1 |
| 6,710,349 B2 * | 3/2004 | Shao ...................... | 250/363.03 |
| 6,737,103 B2 * | 5/2004 | Polichar et al. ............... | 427/65 |
| 2004/0174950 A1* | 9/2004 | Polichar et al. ............ | 378/98.2 |
| 2006/0049357 A1* | 3/2006 | Tumer .................... | 250/363.03 |
| 2006/0049362 A1* | 3/2006 | Friedman et al. ........... | 250/374 |

OTHER PUBLICATIONS

Ryan, James M. "SONTRAC: an Imaging Spectrometer for Solar Neutrons", SPIE vol. 4853—Innovative Telescopes and Instrumentation for Solar Astrophysics. (Feb. 2003) pp. 399-410.

* cited by examiner

*Primary Examiner*—David Porta
*Assistant Examiner*—Faye Boosalis
(74) *Attorney, Agent, or Firm*—McDermott Will & Emery LLP

(57) ABSTRACT

A gamma vector camera detects and determines the energy and the direction of an incident gamma ray. The gamma vector camera includes a detector that produces scintillation light upon interaction with the incident gamma ray. A sensor records the locations and the intensities of the scintillation light produced in the detector. A processor determines the energy and the direction of the incident gamma ray based on the locations and the intensities of the scintillation light recorded by the sensor.

11 Claims, 16 Drawing Sheets

GAMMA VECTOR CAMERA

This application claims the benefit of U.S. Provisional Application No. 60/484,850, filed Jul. 3, 2003, which is hereby incorporated by reference.

STATEMENT AS TO RIGHTS TO INVENTIONS MADE UNDER FEDERALLY SPONSORED RESEARCH OR DEVELOPMENT

Not applicable

FIELD OF THE INVENTION

The present invention concerns a gamma ray detector, and more particularly concerns a gamma vector camera for detecting and determining the energy and direction of incident gamma rays.

BACKGROUND OF THE INVENTION

Imaging gamma rays having energies in the range of 0.5 MeV to 2.0 MeV is useful for a variety of applications. For example, Cesium-137, which produces a 0.662 MeV gamma ray line, and Co-60, which produces 1.17 and 1.33 MeV gamma ray lines, are likely ingredients in a "dirty bomb." The ability to monitor for the presence of these isotopes by monitoring and imaging gamma rays in their respective energy ranges would be important for anti-terrorism security purposes. Other applications for imaging gamma rays include medical imaging, non-destructive testing, mapping hot spots after nuclear accidents, and monitoring for leakage of radioactive waste.

Many conventional gamma ray imaging systems are variations of a simple pinhole camera design such as the system depicted in FIG. 1. As shown in FIG. 1, a position-sensitive gamma ray detector 1 is encased by an absorber 2 having a pinhole aperture 3. Gamma sources 4 are imaged by detecting the position at which gamma rays 5 emitted by gamma sources 4 are incident to detector 1. While a pinhole camera design offers a relatively simple solution for gamma ray imaging, the use of such a design includes significant disadvantages.

Pinhole camera designs suffer from low sensitivity since only a small portion of gamma rays 5 emitted by gamma sources 4 pass through aperture 3 to reach detector 1. Improving the sensitivity of the system by focusing gamma rays 5 is nearly impossible due to the difficulty associated with focusing gamma rays. Increasing the diameter of aperture 3 to improve sensitivity produces the undesirable consequence of also reducing imaging resolution.

In addition to sensitivity issues, gamma ray energies often create problems for imaging system designs that rely on absorbers to block a portion of the gamma rays. Specifically, gamma ray energies are usually too high to be effectively absorbed by an absorber having a reasonable thickness. Accordingly, imaging system designs that rely on absorbers are typically limited for use in imaging gamma rays having energies below a few hundred keV.

Another disadvantage associated with many conventional gamma ray imaging systems is a limited field of view. With a limited field of view, these conventional systems become directional and therefore require prior knowledge of the general position of a gamma source in order to image that gamma source. Accordingly, conventional imaging systems are not well suited for locating hidden gamma ray sources.

Finally, many conventional gamma ray imaging systems are unable to determine the direction of individual gamma rays and rely on multiple gamma rays to reconstruct a gamma source. Because of this limitation, conventional gamma ray imaging systems often require the relative positions of the imaging system and the gamma source to remain constant or in some known relation to provide useful resolution for the imaging system. This limitation also makes real-time tracking of a gamma source very difficult when either the gamma source or the imaging system is moving.

In view of the foregoing drawbacks associated with conventional gamma ray imaging systems, a need exists for a relatively small and inexpensive device for imaging gamma rays having energies in the range of 0.5 MeV to 2 MeV. Ideally, the imaging device would be capable of determining the direction of incidence of the gamma rays as well as the energy of the gamma rays.

SUMMARY OF THE INVENTION

The present invention addresses the foregoing concerns by providing a gamma vector camera that utilizes a direction sensitive gamma ray detector, which can be used to detect and determine the direction and the energy of incident gamma rays. By using a direction sensitive gamma ray detector 6 as depicted in FIG. 2, gamma sources 4 can be located by detecting and determining the direction of gamma rays 5.

According to one aspect of the invention, a gamma vector camera includes a detector that produces scintillation light upon interaction with an incident gamma ray. A sensor records the locations and the intensities of scintillation light produced in the detector. A processor then determines the energy and the direction of the incident gamma ray based on the locations and the intensities of the recorded scintillation light.

Preferably, the detector is comprised of multiple layers arranged on respective parallel planes. Each of the layers contains multiple fiber-optic scintillators arranged parallel to each other on the plane of the layer in a direction orthogonal to the direction of the fiber-optic scintillators arranged in adjacent layers. Incident gamma rays interact with the detector by Compton-scattering in the fiber-optic scintillators. Recoil electrons produced by the Compton-scattering cause scintillation light to be generated in the fiber-optic scintillators as they traverse the detector.

The sensor is preferably comprised of a first photo sensor for detecting the location and light intensity of scintillation light produced by the fiber-optic scintillators arranged in a first direction and a second photo sensor for detecting the location and light intensity of scintillation light produced by fiber-optic scintillators arranged in a second direction orthogonal to the first direction. Each photo sensor is comprised of multiple elements in correspondence with the fiber-optic scintillators from which the respective photo sensor detects scintillation light, where the location of the scintillation light is determined based on which of the elements detects scintillation light.

The gamma vector camera of the present invention has significant advantages over conventional gamma ray imaging systems. The detector of the present invention does not use a pinhole camera design and does not need absorbers to block gamma rays. Accordingly, the invention provides a gamma vector camera having a spherical field of view with nearly uniform sensitivity. Furthermore, the ability to reconstruct the direction and energy of incident gamma rays using the recorded location and intensity of scintillation light produced in the detector allows real-time tracking of a gamma source regardless of any movement of the gamma source or the gamma vector camera. Further advantages and benefits of the present invention will become apparent from the detailed description below.

The foregoing brief summary of the invention has been provided so that the nature of the invention may be understood quickly. A more complete understanding of the invention can be obtained by reference to the following detailed description of the invention in connection with the accompanying drawings.

DETAILED DESCRIPTION OF THE INVENTION

Figure 1:
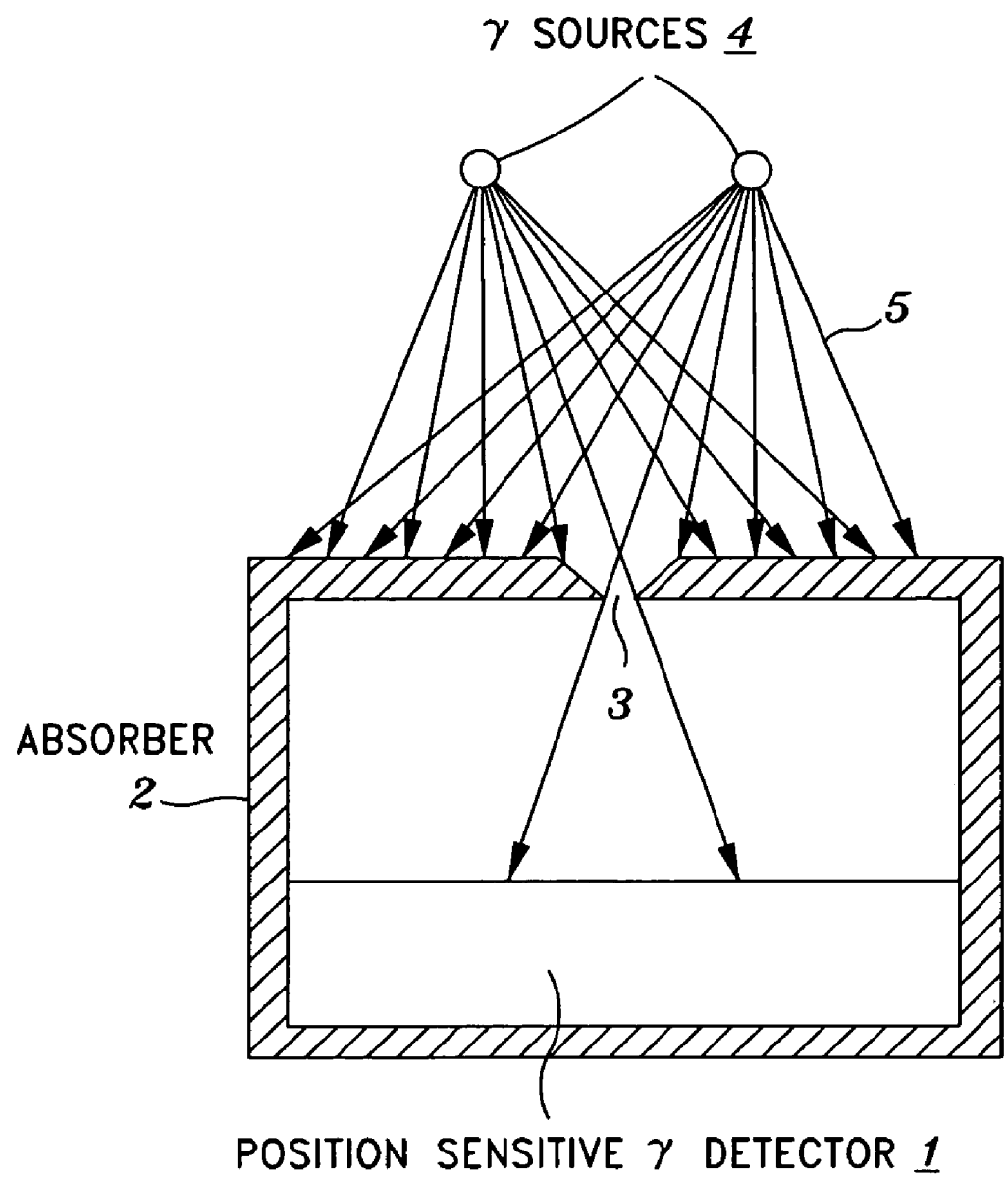
FIG. 1 is a diagram depicting a gamma ray imaging system based on a pinhole camera design.
Figure 2:
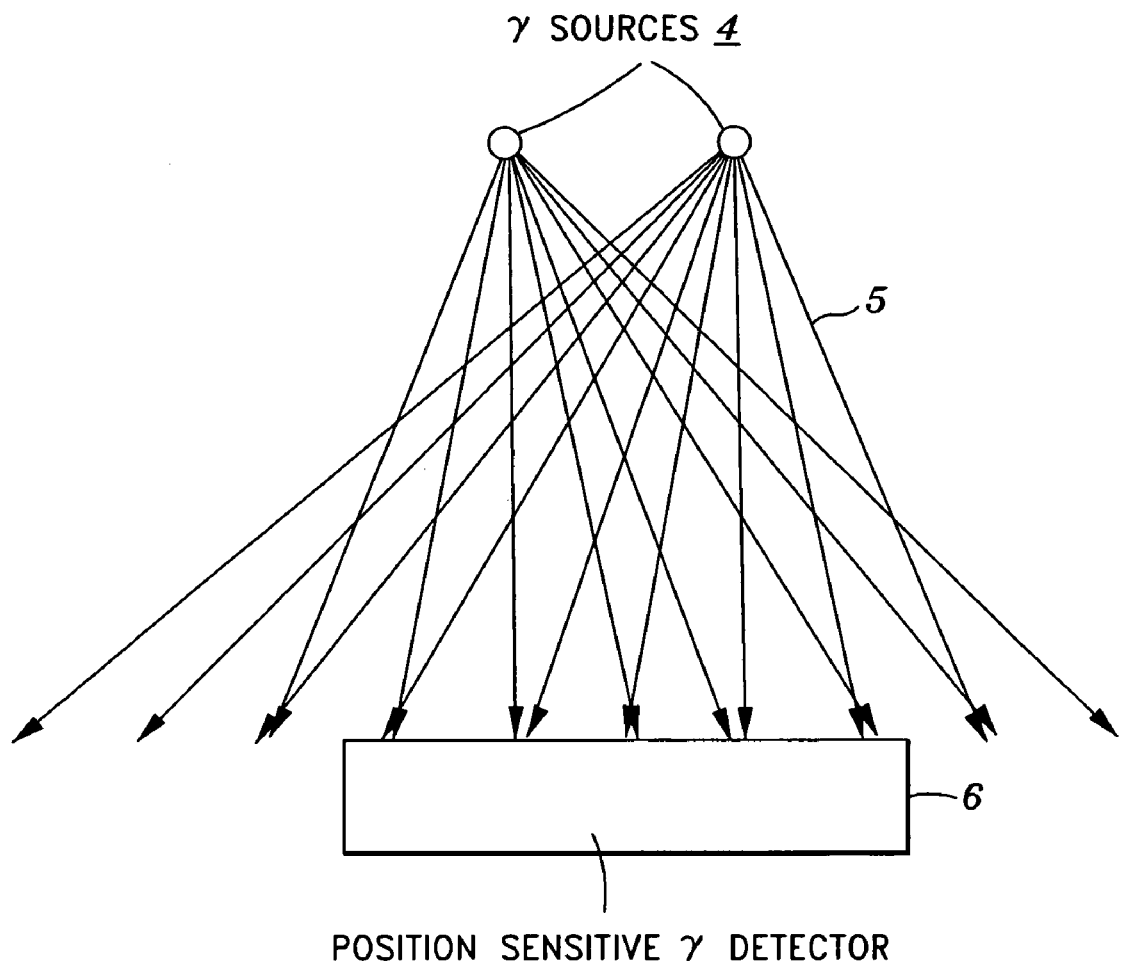
FIG. 2 is a diagram depicting a gamma ray imaging system utilizing a direction-sensitive detector.
Figure 3:
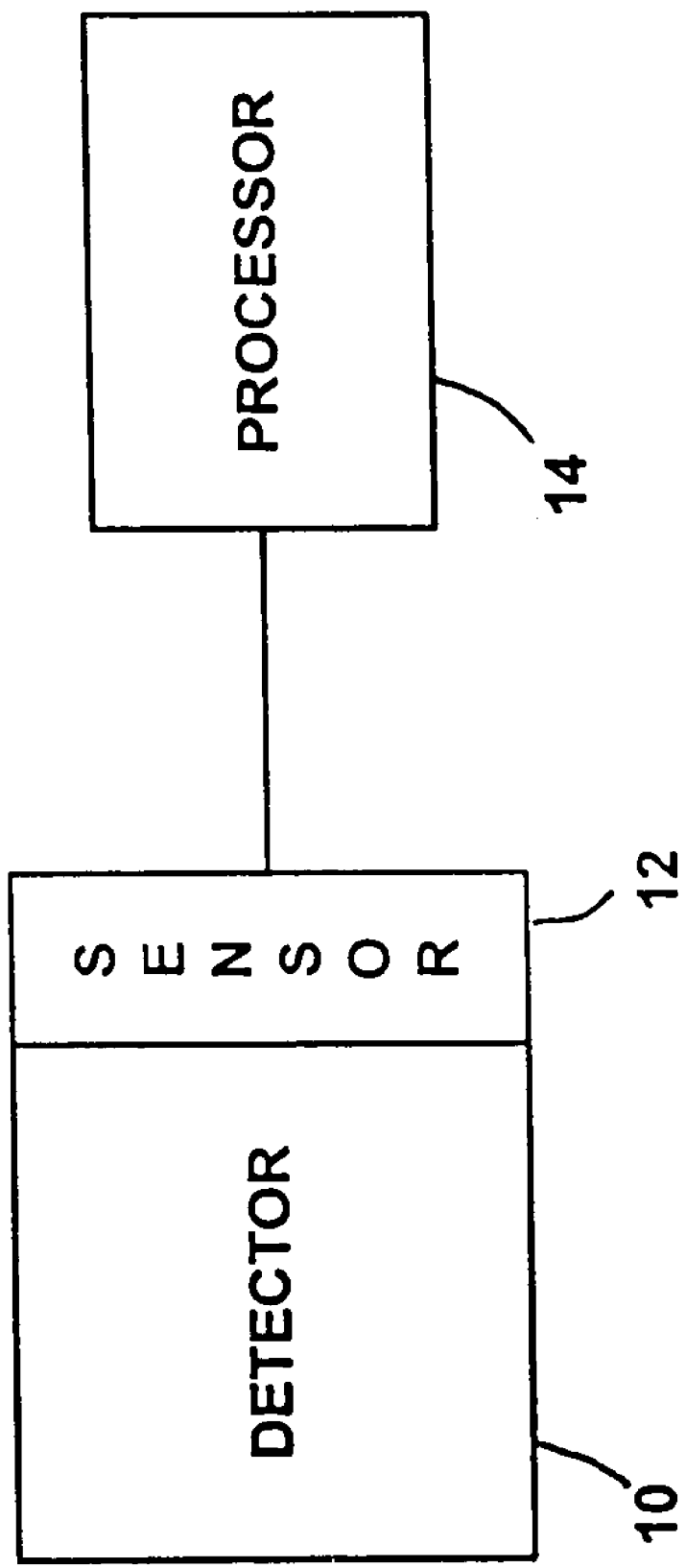
FIG. 3 is a block diagram depicting the basic components of an embodiment of the present invention.

FIG. 3 is a block diagram depicting the basic components of an embodiment of the present invention. As shown in FIG. 3, the invention comprises a detector 10, a sensor 12 and a processor 14. Detector 10 is constructed using a detection material that interacts with incident gamma rays producing scintillation light. Sensor 12 records the locations and intensities of the scintillation light associated with interactions between the incident gamma ray interactions and detector 10. Processor 14 obtains the recorded data on the interaction locations and intensities from sensor 12. Using the recorded data, processor 14 reconstructs the energy and direction of the incident gamma rays. Each of the foregoing components of the invention, together with their associated processes, is described in more detail below.

Figure 4A:
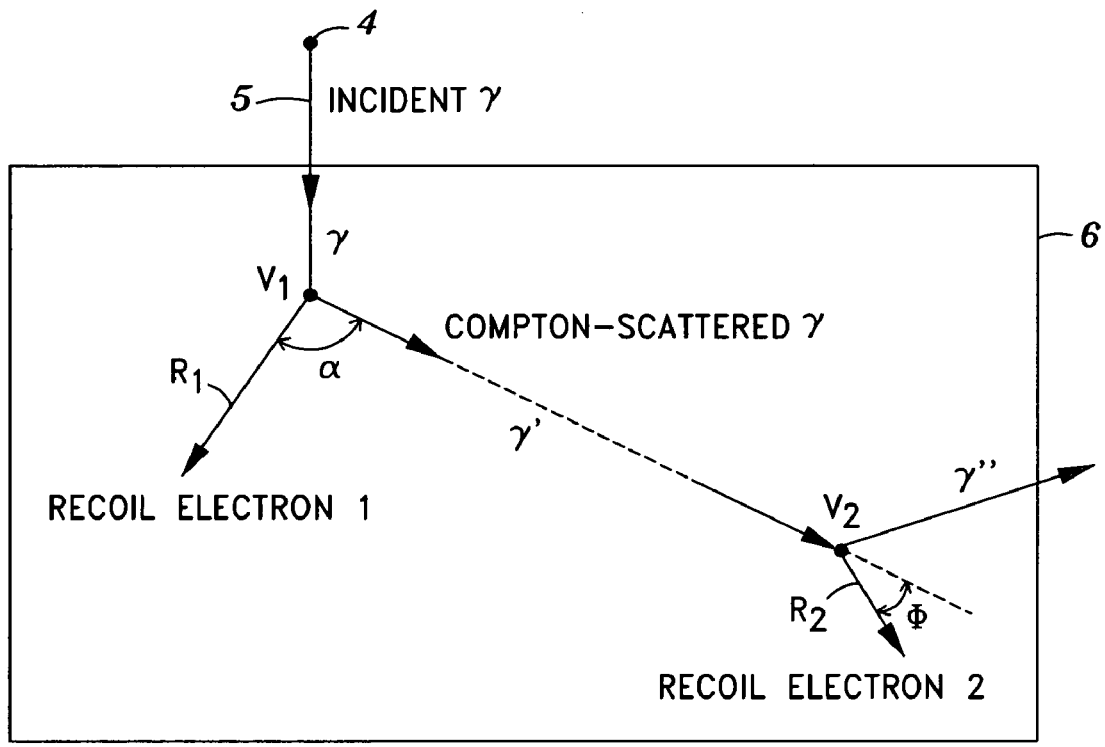
FIG. 4 is a diagram depicting the interactions of an incident gamma ray with a detecting material.
Figure 4B:
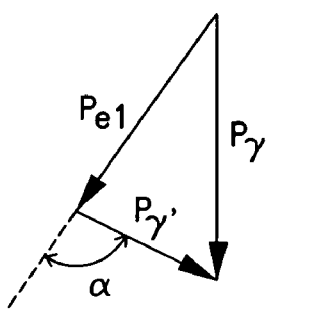
Figure 4C:
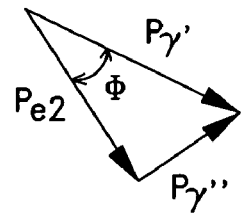

The operation of the invention is based on the fact that higher energy gamma rays are likely to scatter inside an appropriate detecting material and deposit energy at one or more locations within the material. FIGS. 4A to 4C are diagrams depicting possible interactions of an incident gamma ray within such a detecting material. As shown in FIG. 4A, an incident gamma ray γ5 enters detecting material 6 and is Compton-scattered at a point $V_1$. As a result of the Compton-scattering, a recoil electron $R_1$ and a Compton-scattered gamma ray γ' are produced. γ' then travels within detecting material 6 and is subsequently Compton-scattered at a point $V_2$. The second Compton-scattering produces a Compton-scattered gamma ray γ" and recoil electron $R_2$. Using the locations of $V_1$ and $V_2$, together with the energies and directions of recoil electrons $R_1$ and $R_2$, the energy and direction of incident gamma ray γ can be reconstructed, as described in detail below.

Figure 5:
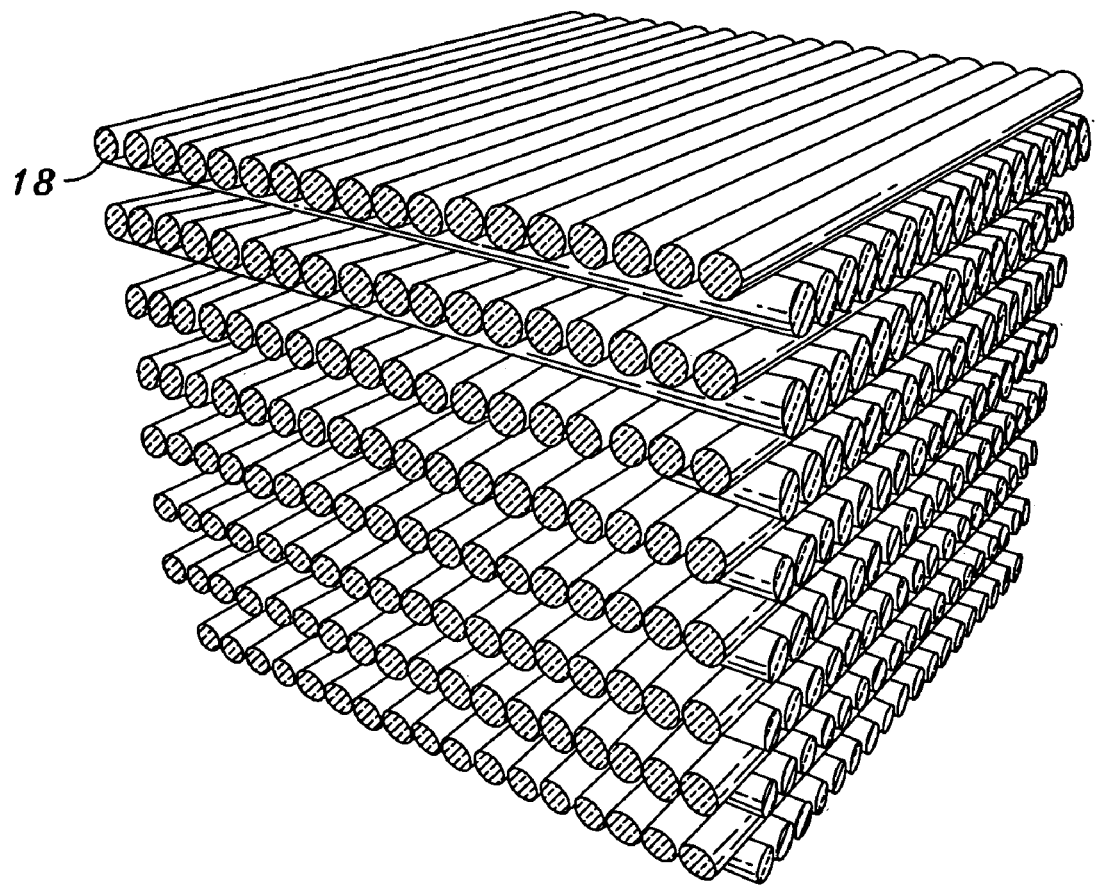
FIG. 5 is a diagram depicting the construction of an electron-tracking detector.
Figure 5:
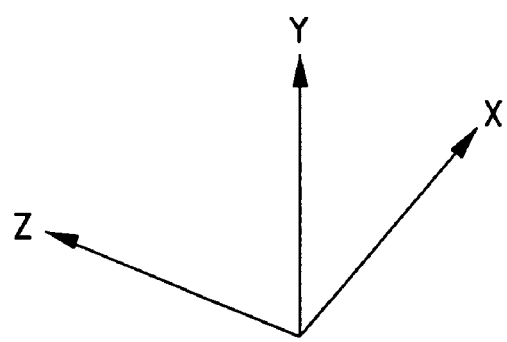

FIG. 5 depicts an example of the construction of detector 10. In this example, detector 10 is constructed using multiple layers of fiber-optic scintillators 18 to form a cube. The fiber-optic scintillators 18 used to form each layer are arranged parallel to each other in a plane and are oriented in a direction that is orthogonal to the direction of the fiber-optic scintillators 18 in adjacent layers. In this manner, half of the fiber-optic scintillators 18 used to form the cube are parallel to the z-axis and terminate in the x-y plane, while the other half of the fiber-optic scintillators 18 are parallel to the x-axis and terminate in the y-z plane.

When a recoil electron traverses detector 10, the recoil electron loses energy which produces scintillation light in the traversed fiber-optic scintillators 18. A portion of this scintillation light is trapped and travels down the axis of the respective fiber-optic scintillators 18 where it can be detected at the end. By identifying which of the fiber-optic scintillators 18 produce scintillation light, the track of a recoil electron within detector 10, and hence the starting point and direction of the recoil electron, can be determined.

The material of the fiber-optic scintillators 18 used in detector 10 must have appropriate properties for proper operation of the present invention. One significant advantage of the invention over conventional gamma imaging systems is that the invention can and preferably does operate using a single type of material in detector 10. For example, some conventional systems rely on the detection of both Compton-scattering and photo-absorption of incident gamma rays. Because materials suitable for photo-absorption typically have a much higher atomic number Z than those preferred for Compton-scattering, these system usually require two different types of materials to detect these respective events. On the other hand, the invention reconstructs incident gamma rays using only Compton-scattering events of the incident gamma ray and therefore only a single type of detection material is needed.

As indicated above, one of the requirements for reconstructing an incident gamma ray is the ability to determine the directions of the recoil electrons $R_1$ and $R_2$. Electrons are easily deflected as they travel through a material, with the probability of a large-angle deflection per unit length traveled decreasing with the atomic number Z of the material. Accordingly, fiber-optic scintillators made of a material having a low atomic number Z are preferable for construction of detector 10. One such material suitable as material for fiber-optic scintillators 18 is polystyrene ($C_8H_8$) doped with scintillating compounds. However, one skilled in the art will recognize that other types of detection materials may be usable in the present invention.

The dimensions of detector 10, together with those of fiber-optic scintillators 18, are preferably optimized for detecting gamma rays having particular energies. For purposes of this description, the dimensions of detector 10 described below are best suited for detecting a Cs-137 gamma ray having a typical energy of 662 keV. One skilled in the art will recognize that similar processes can be performed to determine optimal dimensions for detecting gamma rays having other energies.

As described above, the present invention relies on interactions between detector 10 and incident gamma rays. Accordingly, the dimensions of detector 10 should provide a reasonable chance for an incident gamma ray to interact with detector 10. Based on the mean free path of 662 keV gamma rays in polystyrene, and common dimensions of other components used in the invention such as CCDs described below, dimensions of 10×10×10 cm$^3$ for detector 10 were selected for a gamma vector camera designed to detect Cs-137 gamma rays. One skilled in the art will recognize that the present invention is not limited to a detector having these particular dimensions, and that other dimensions may be used without departing from the scope of the invention.

In order to determine the location of a recoil electron track within detector 10, the recoil electron should travel through at least two layers of detector 10. When scintillation light is produced in fiber-optic scintillators 18 in at least two layers of detector 10, the locations of those fiber-optic scintillators are combined to determine a three-dimensional location of the electron track within detector 10. Accordingly, the width or diameter of each of the fiber-optic scintillators 18 should be smaller than the range of recoil electrons in the fiber-optic material.

Using a GEANT4 Monte Carlo simulation with 100,000 events, it was determined that about 68% of the recoil electrons produced by interactions of 662 keV gamma rays with polystyrene have energies of at least 100 keV. A 100 keV recoil electron has a range in polystyrene of around 140 µm, which would require a width or diameter of no more than 70 µm for each of the two layers the recoil electron should traverse. Taking into account that recoil electrons often travel at an angle relative to the axis of the fiber-optic scintillators 18, the preferred width or diameter of each of the fiber-optic scintillators 18 should be no larger than 50 µm and preferably 25 µm or less.

Figure 6:
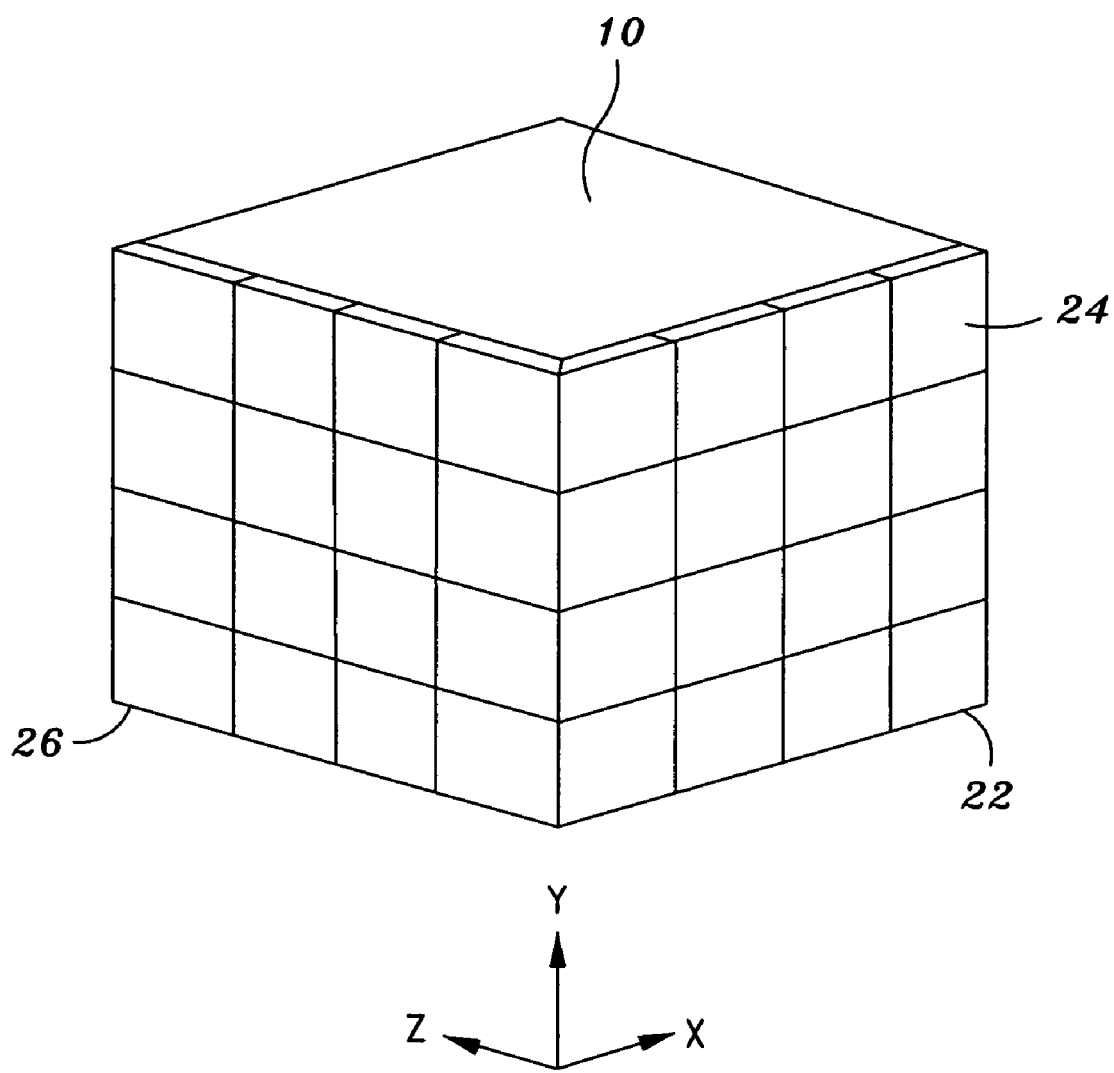
FIG. 6 is a diagram depicting the configuration of photo sensor arrays.

As mentioned above, the location of a recoil electron track is determined based on which of the fiber-optic scintillators 18 produce scintillation light. To detect this scintillation light, a pair of photo sensor arrays is positioned adjacent to detector 10. When detector 10 is arranged as depicted in FIG. 6, an x-y photo sensor array 20 is positioned adjacent to the ends of the fiber-optic scintillators 18 arranged parallel to the z-axis and a y-z photo sensor array 22 is positioned adjacent to the ends of the fiber optic scintillators 18 arranged parallel to the x-axis. Constructing detector 10 and sensor 12 in this manner provides a non-directional gamma ray detector having a spherical field of view with nearly uniform sensitivity.

Each of the photo sensor arrays 20 and 22 comprises multiple pixel elements 24 arranged to correspond with the ends of the fiber-optic scintillators 18 adjacent to the respective photo sensor array. Pixel elements 24 can be arranged in a one-to-one correspondence with the adjacent fiber-optic scintillators 18. Alternatively, more than one pixel element 24 can be arranged in correspondence with each of the adjacent fiber-optic scintillators 18. The pixel elements 24 record the light intensity of the scintillation light produced by the adjacent fiber-optic scintillators 18.

Photo sensor arrays 20 and 22 are preferably implemented using charge-coupled devices (CCDs) having an appropriate resolution. CCDs are preferable since they are readily available at relatively low cost. Alternatively, each of the photo sensor arrays 20 and 22 might be implemented using a linear photodiode array, a linear phototransistor array, a Darlington avalanche photodiode array, a CMOS array, a microchannel plate, or photomultiplier tubes.

As incident gamma rays interact with detector 10, events are recorded by processor 14 using photo sensor arrays 20 and 22. Specifically, when an incident gamma ray interacts with detector 10 producing recoil electrons, processor 14 records the event by reading the respective light intensities of the scintillation light recorded by pixel elements 24 in photo sensor arrays 20 and 22 and storing the light intensities together with the coordinates of the respective pixel elements 24 in an event list. For each event, an x-y event list is created containing data entries of the (x,y) coordinates of the pixel elements 24 that recorded scintillation light in the x-y photo sensor 20 together with the associated recorded light intensity, and a y-z event list is created containing data entries of the (y,z) coordinates of the pixel elements 24 that recorded scintillation light in the y-z photo sensor 22 together with the associated recorded light intensity. Also included in the data entries is time the light intensity was recorded.

In order to distinguish scintillation light from noise, any of a number of conventional noise reduction techniques can be employed in the invention. For example, known noise reduction algorithms might be used to remove a noise component from the intensity recorded by pixel elements 24. Alternatively, additional pixel elements 24 that do not correspond to any of fiber-optic scintillators 18 might be used in real time to record any noise in the system, which is then removed from the intensities recorded by pixel elements 24 that do correspond to fiber-optic scintillators 18. One skilled in the art will recognize that other noise reduction algorithms and systems might also be employed in the present invention.

The fraction of gamma rays produced by a gamma source that enter detector 10 depends on the size of detector 10 and the distance between detector 10 and the gamma source. Preferably, the present invention is capable of recording and storing at least 100 events per second. To achieve this rate, the photo sensor arrays 20 and 22 are read and processed at a rate of 100 frames per second.

Figure 7:
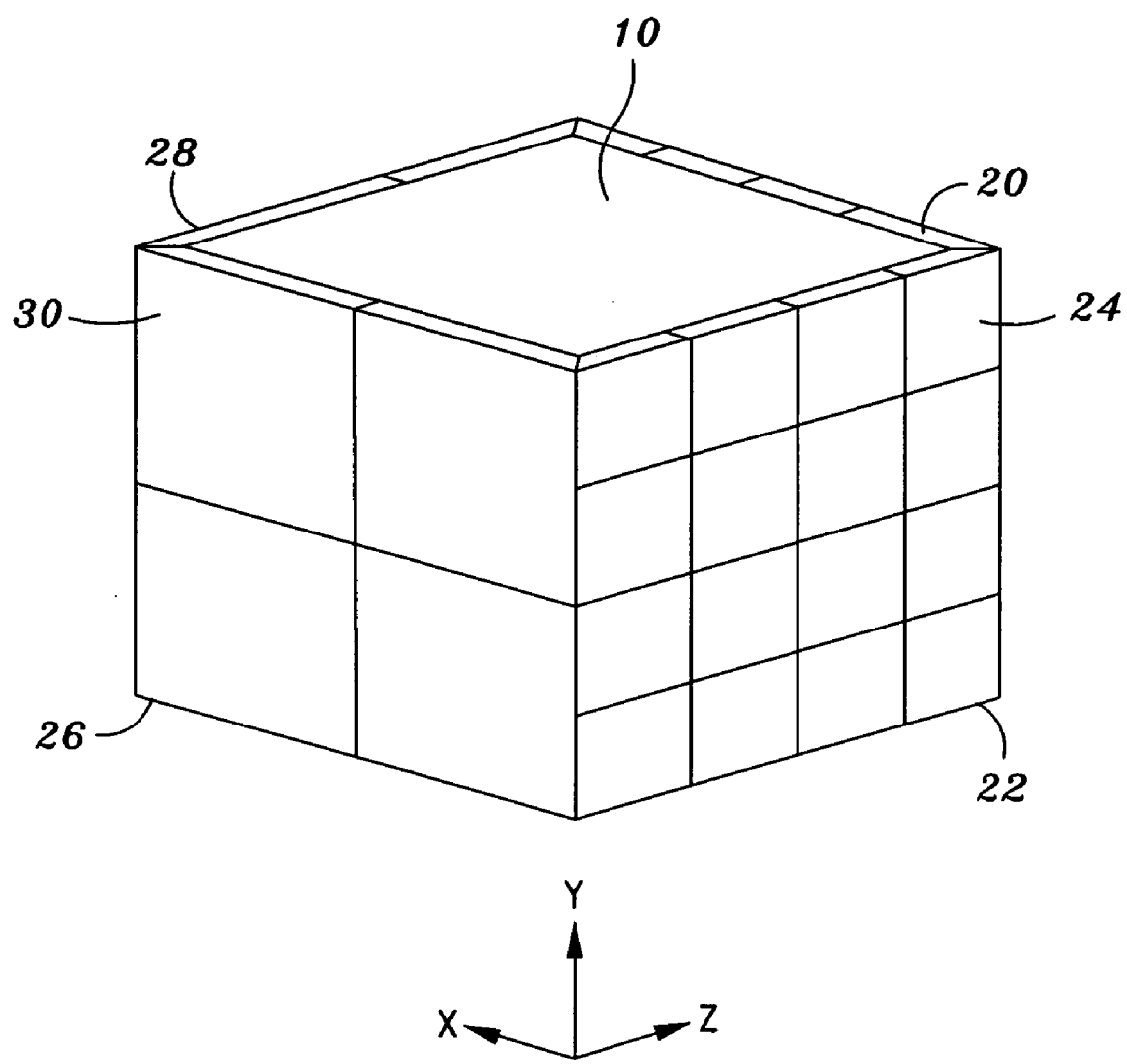
FIG. 7 is a diagram depicting the configuration of photo sensor arrays and their associated diode trigger arrays.

Alternatively, the present invention can be implemented using an array of diode triggers for each of photo sensors 20 and 22 to trigger the reading and processing of a portion of the pixel elements 24 in photo sensors 20 and 22. FIG. 7 depicts the construction of detector 10 and sensor 12 using this alternative embodiment. As shown in FIG. 7, fast sensor arrays 26 and 28, which are comprised by diode triggers 30, are arranged at opposite ends of the fiber-optic scintillators 18 from x-y photo sensor 20 and y-z photo sensor 22. Each of diode triggers 30 corresponds to a number of pixel elements 24 in the corresponding photo sensor array. For example, FIG. 7 shows a ratio of one diode trigger 30 for every four pixel elements 24. When one of diode triggers 30 detects scintillation light at the end of one or more fiber-optic scintillators 18, the pixel elements 24 corresponding to the particular diode trigger 30 are read and recorded by processor 14. In this manner, only those pixel elements 24 that are in the area where scintillation light has been recorded are read by processor 14. By matching the times when diode triggers 30 detect scintillation light and cause a portion of pixel elements 24 to be read, detected scintillation light associated with the same event is matched.

The numbers of pixel elements 24 and diode triggers 30 depicted in FIGS. 6 and 7 are for description purposes only.

Using the preferred dimension of detector 10 and the preferred diameter of fiber-optic scintillators 18, one skilled in the art will recognize that the actual numbers of these elements will exceed the numbers depicted in these figures.

Figure 8:
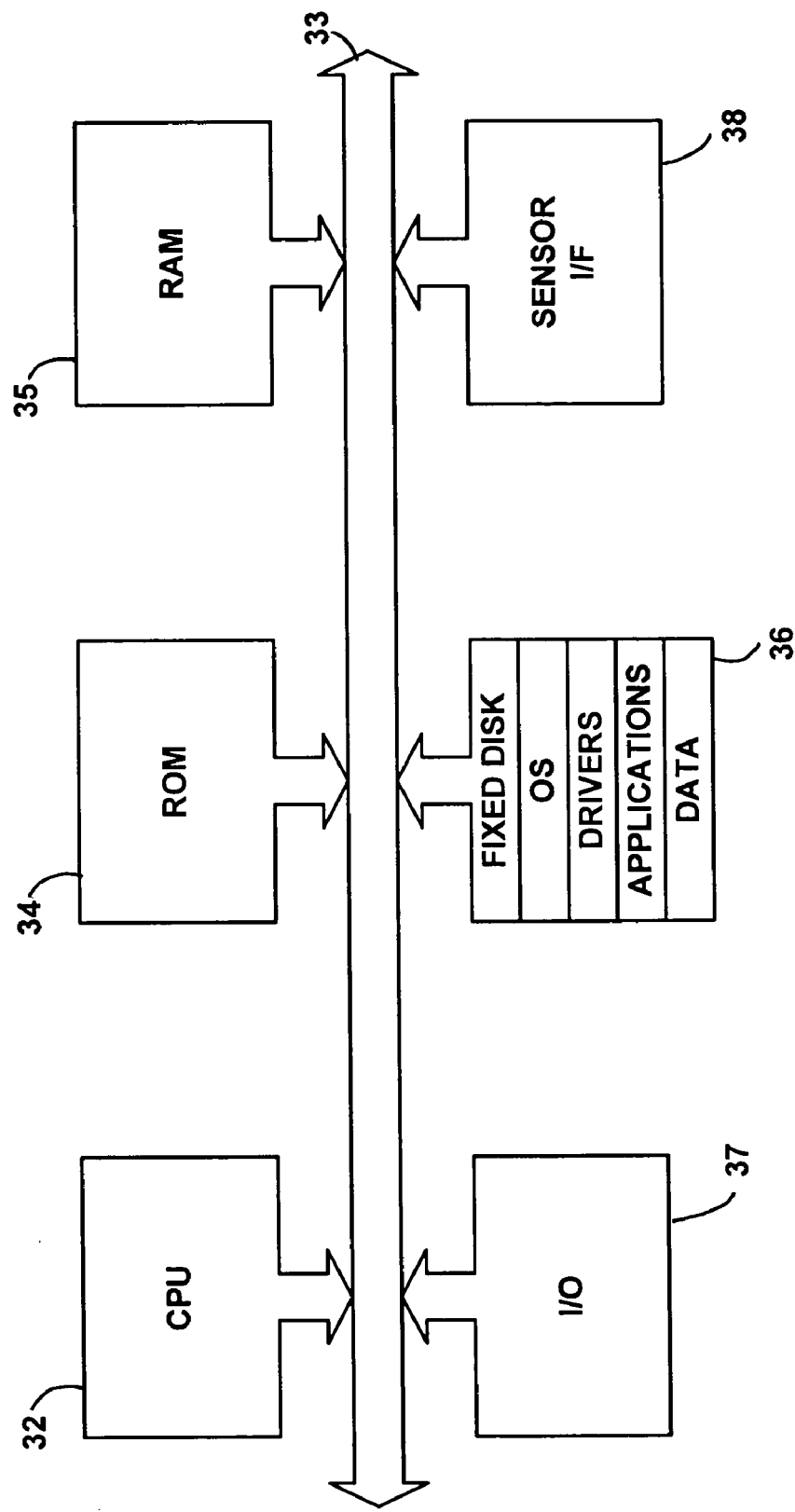
FIG. 8 is a block diagram depicting the internal architecture of a processor according to the present invention.

FIG. 8 is a block diagram depicting the basic components of processor 14. In particular, processor 14 comprises a central processing unit such as a programmable microprocessor (CPU) 32 that is interfaced to a data bus 33. Also interfaced to data bus 33 are read-only memory (ROM) 34, random-access memory (RAM) 35, fixed disk 36, I/O interface 37 and sensor interface 38.

CPU 32 executes program instructions sequences that have been loaded into RAM 35, which acts as a main run-time memory for CPU 32. The program instructions sequences are loaded into RAM 35 by CPU 32 from fixed disk 36 or some other computer-readable memory medium such as CD or DVD media. Fixed disk 36 stores program instruction sequences of multiple software modules. The software modules stored in fixed disk 36 include, but are not limited to, an operating system for managing the software applications and resources of processor 14; drivers for controlling and communicating with peripheral devices attached to processor 14 via I/O interface 37 and sensor I/F 38; application modules for performing the processes used to implement the present invention, which are described in detail below; and data such as event lists and data representing the energy and direction of incident gamma rays reconstructed according to the present invention. ROM 34 stores invariant instruction sequences to be executed by CPU 32, such as start-up instruction sequences and basic input/output system (BIOS) instruction sequences, for the operation of certain peripheral devices attached to processor 14. I/O interface 37 provides an interface to processor 14 for input-output devices such as a keyboard, pointing device, monitor, printer, etc. Sensor interface 38 provides an interface between processor 14 and the photo sensor arrays of sensor 12.

Processor 14 can be implemented using a general purpose computer such as a PC-compatible computer or laptop to which sensor 12 of the present invention is interfaced. In addition, the internal components of processor 14 described above can be incorporated into a single apparatus together with detector 10 and sensor 12. Alternatively, processor 14 and the processes associated with the present invention might be implemented completely in hardware using logical circuits such as gate arrays.

The present invention performs a three-part process for each recorded event to reconstruct the associated incident gamma ray. First, the data entries in each event list are sorted and isolated into lists for individual recoil electron tracks. Second, using the data entries for each recoil electron track, the recoil electron track is reconstructed by determining the starting point, direction and energy of the recoil electron associated with the recoil electron track. Finally, using the reconstructed electron tracks, the energy and direction of the incident gamma ray are determined. Each of these processes is described in more detail below.

Figure 9:
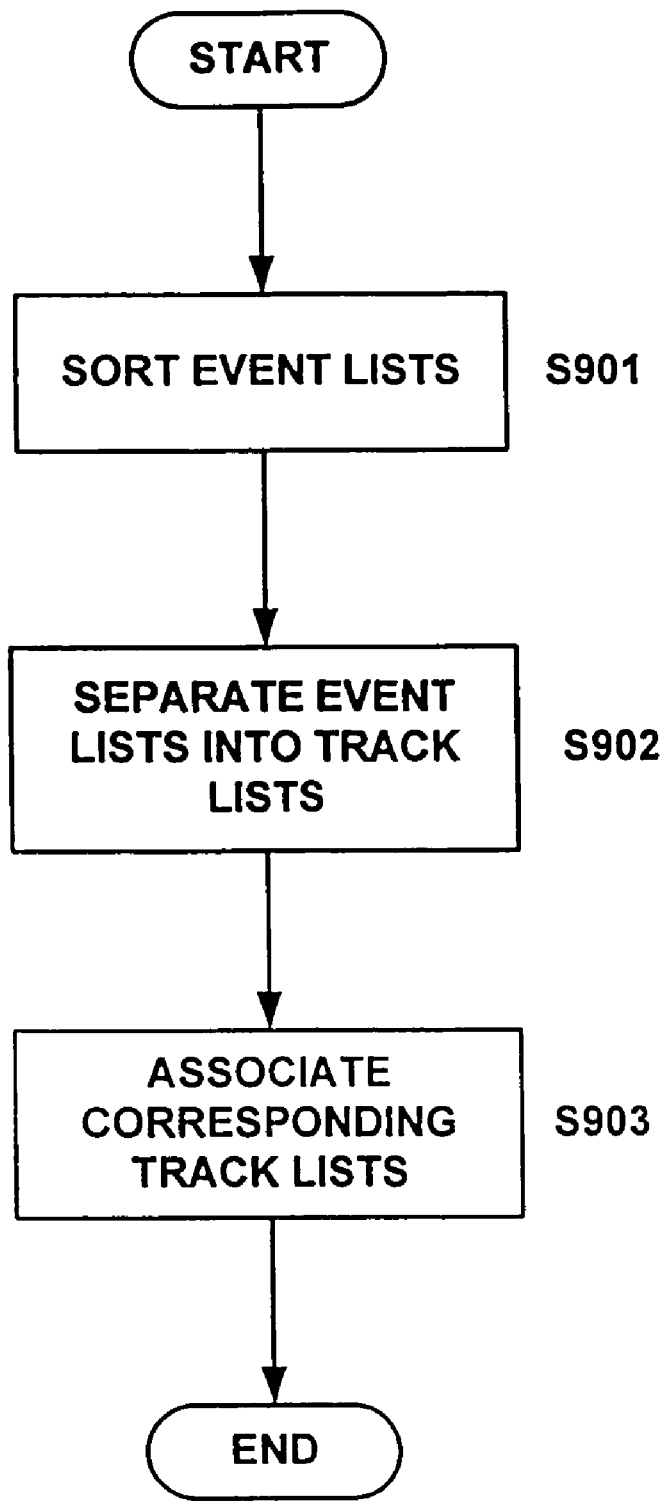
FIG. 9 is a flowchart depicting a process for sorting and associating track lists.

FIG. 9 is a flowchart depicting a process for sorting the event lists into track lists for respective recoil electron tracks. As described above, the event lists include an x-y event list of coordinates and associated light yields from the x-y photo sensor array and a y-z event list of coordinates and associated light yields from the y-z photo sensor array. The process comprises sorting the data entries in the event lists (Step S901), separating the sorted data entries into track lists (Step S902), and associating corresponding track lists (Step S903).

In step S901, each of the event lists is sorted using the coordinate dimension having the largest spread. Specifically, the x-y event list is sorted by determining which coordinate, either x or y, has the largest spread in the data entries of the event list and sorting the data entries from lowest to highest value of the sorting coordinate. The y-z event list is sorted by either the y or z coordinate in the same manner.

Figure 10:
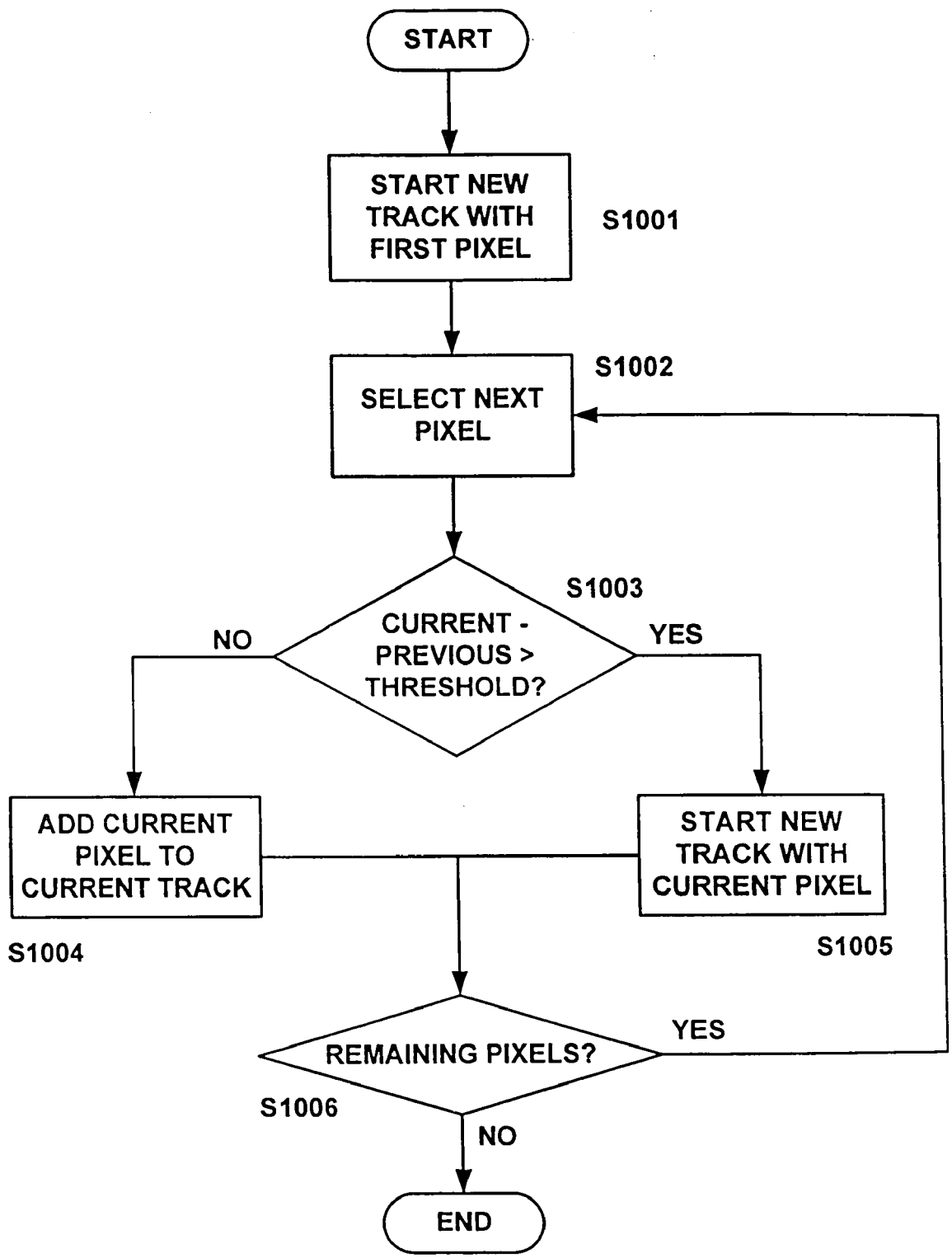
FIG. 10 is a flowchart depicting a process for sorting data entries into track lists.

In step S902, the data entries of the sorted event lists are separated into individual track lists, where each track list corresponds to the track of a recoil electron. FIG. 10 is a flowchart depicting a process for separating the data entries into individual track lists. In step S1001, a track list is created using the first data entry in the event list. The next data entry in the event list is selected in step S1002 and compared to the previous entry using the sorting coordinate in step S1003. If the sorting coordinate value of the current data entry does not exceed that of the previous data entry by a threshold value, the current data entry is assumed to be part of the current recoil electron track and is added to the current track list in step S1004. Alternatively, if the sorting coordinate of the current data entry exceeds that of the previous data entry by the threshold value, the current data entry is assumed to be too far apart from the previous entry to be part of the same recoil electron track and a new track list is created using the current data entry as the initial entry in step S1005.

The threshold value used in the process described above is set based on the probable separation of recoil electrons produced by a scattered gamma ray. Specifically, if two data entries are separated by less than a certain percentage of the mean free path of a gamma ray, then the two data entries are assumed to be the result of the same recoil electron and not two different recoil electrons. According to one embodiment, 600 µm, which is 1% of the mean free path of a 100 keV gamma ray, was used to establish the threshold value. The threshold value is determined by dividing this distance by the width or diameter of the fiber-optic scintillators 18.

In step S1006, it is determined whether another data entry exists in the current event list. If another data entry exists, the process returns to step S1002 and the process is repeated. This cycle repeats until the entire event list has been traversed and sorted into individual track lists. This process is performed for both the x-y event list and the y-z event list of each recorded event.

Figure 11:
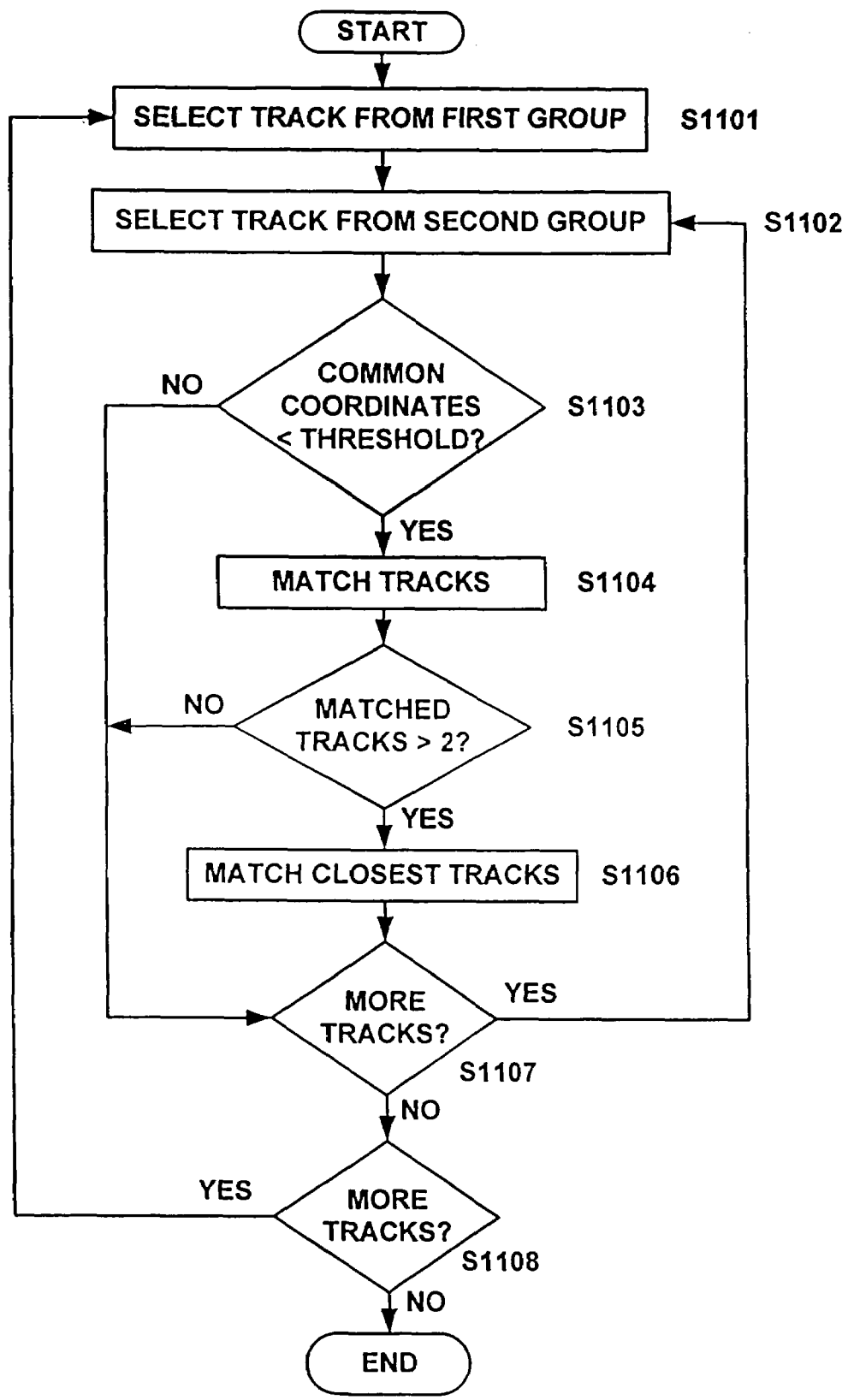
FIG. 11 is a flowchart depicting a process for associating corresponding track lists.

Returning to FIG. 9, the individual track lists from the x-y event list are matched with their corresponding track lists from the y-z event list in step S903. FIG. 11 is a flowchart depicting a process for matching the corresponding track lists. The process begins by selecting the first track list from the x-y event list in step S1101 and the first track list from the y-z event list in step S1102. The two selected track lists are then compared using their common coordinate, the y coordinate for this embodiment, in step S1103. To compare the two selected track lists, the maximum and minimum values for the common coordinate are compared. If the maximum and minimum common coordinate values of the compared track lists differ from each other by less than a set threshold, the track lists are matched as corresponding track lists in step S1104. For the comparison in step S1103, it is assumed that a recoil electron is not likely to skip multiple layers in detector 10. Accordingly, in one embodiment of the invention, the threshold is set at four pixels. It is to be understood, however, that other threshold values might be utilized.

To confirm that only one track list from each of the x-y event list and the y-z event are matched together for a particular recoil electron, it is determined in step S1104 if more than two track lists are matched as corresponding track lists. If more than two track lists are currently matched, the track lists from each of the x-y event list and the y-z event list that are closest to each other with respect to the maximum and minimum y values are matched as the corresponding track lists in step S1106.

If it is determined in step S1105 that only two track lists are currently matched, or if it is determined in step S1103 that the maximum and minimum values of the common coordinate of the selected track lists differ by more than the set threshold, it is determined in step S1107 if additional track lists remain in the y-z event list. If additional track lists remain, the process returns to step S1102 and the next track list in the y-z event list is selected. If no more track lists remain in the y-z event list, the process proceeds to step S1108 where it is determined whether additional track lists remain in the x-y event list. If additional track lists remain, the process returns to step S1101 and the next track list in the x-y event list is selected. If no more track lists remain in either event list, the process ends. In the foregoing manner, each of the track lists from the x-y event list is compared with each of the track lists from the y-z event list to determine and match corresponding track lists.

Figure 12:
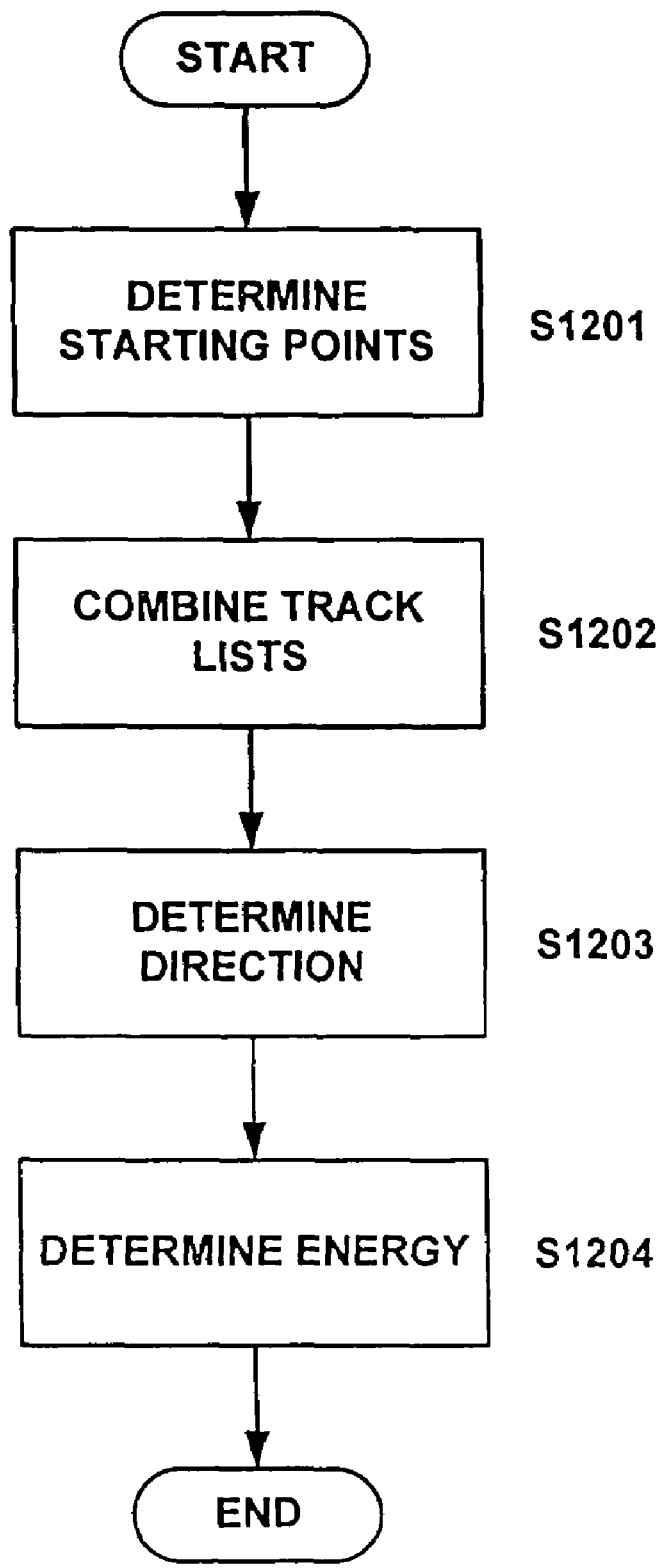
FIG. 12 is a flowchart depicting a process for reconstructing a recoil electron track.

A recoil electron track is reconstructed by defining its starting point, its initial direction and the energy of the recoil electron. FIG. 12 is a flowchart depicting a process for reconstructing the recoil electron track for each pair of corresponding track lists matched in the processes described above. To reconstruct a recoil electron track, a starting point for each of the individual track lists is determined (Step S1201), the corresponding track lists are combined (Step S1202), the original direction of the reconstructed track is determined (Step S1203), and the energy of the recoil electron is determined (Step S1204). Each of these process steps is described in more detail below.

Figure 13:
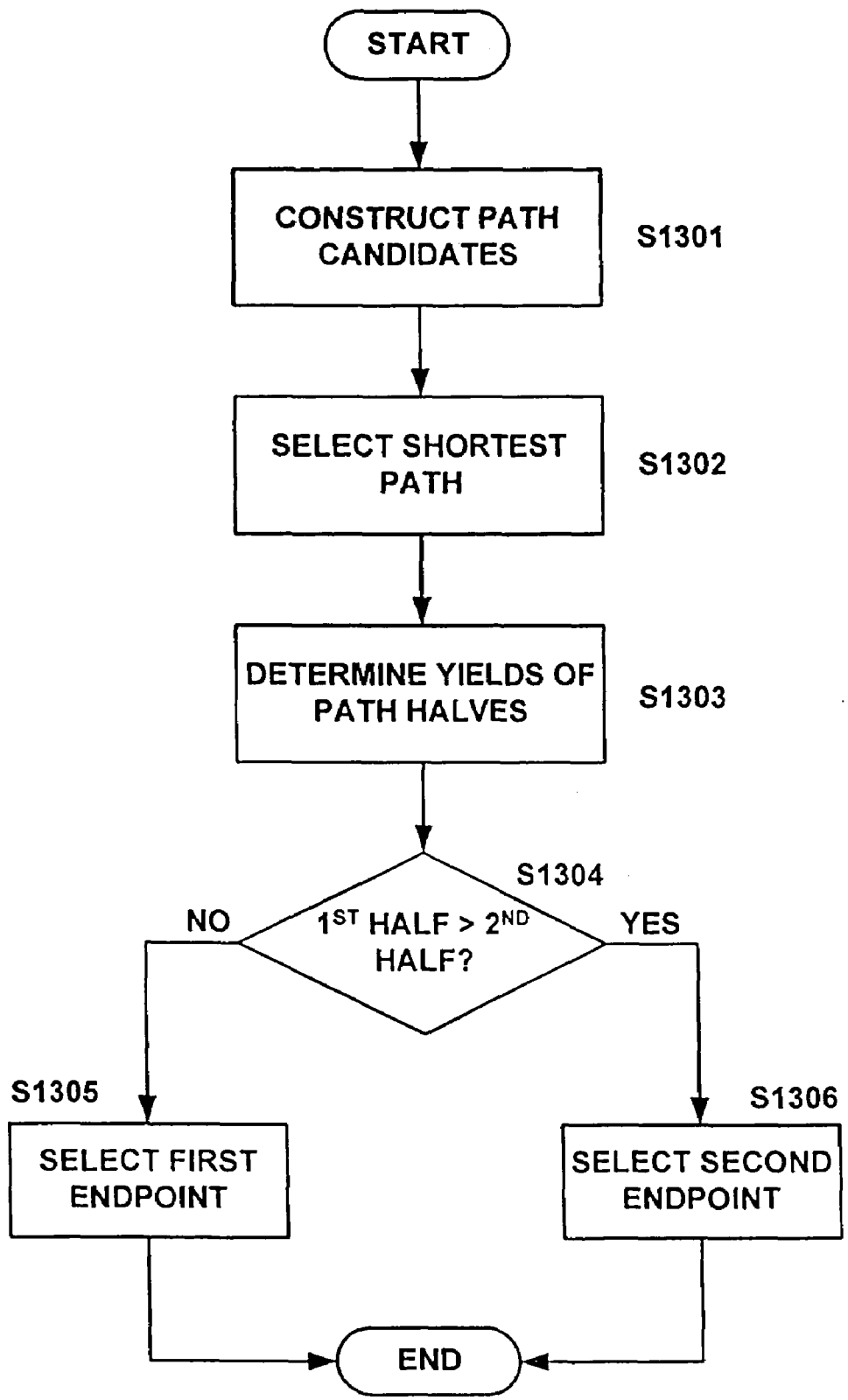
FIG. 13 is a flowchart depicting a process for determining the starting point of a recoil electron track.

To reconstruct a recoil electron track from the corresponding track lists, a starting point for traversing the data entries in the track lists must be determined. FIG. 13 is a flowchart depicting a process for determining the starting point within a track list. In step S1301, candidate paths are constructed as possible tracks. For the majority of electron tracks, the starting point is at an extremum in the direction of one of the coordinates in the track list. Therefore, four candidate paths for each track list are constructed using the data entries having coordinates with the minimum and maximum x and y values for the track lists from the x-y event list as starting points, and data entries having coordinates with the minimum and maximum y and z values from the y-z event list as starting points. The candidate paths are constructed by starting at each of the starting points and moving to the nearest unvisited data entry until all data entries in the track list have been included in the path. The candidate path that has the shortest overall length is then selected in step S1302.

Over the energy range of a few hundred keV, electron energy loss per unit length traveled increases as electron energy decreases. Therefore, the starting point of an electron track should have a smaller light yield per unit length traversed than the end of the electron track. In step S1303, the path selected in step S1302 is divided in half and the light yield for each half is determined using the sum of the light intensity yields from the data entries in the track list. Alternatively, the light yield for each half could be computed per unit length traveled. The light yield for the first half of the selected candidate path and the second half of the candidate path are compared in step S1304. If the light yield for the first half of the path is smaller than that of the second half, the endpoint in the first half is selected as the starting point in step S1305. If the light yield for the first half of the path is larger than that for the second half of the path, the endpoint in the second half is selected as the starting point in step S1306.

Figure 14:
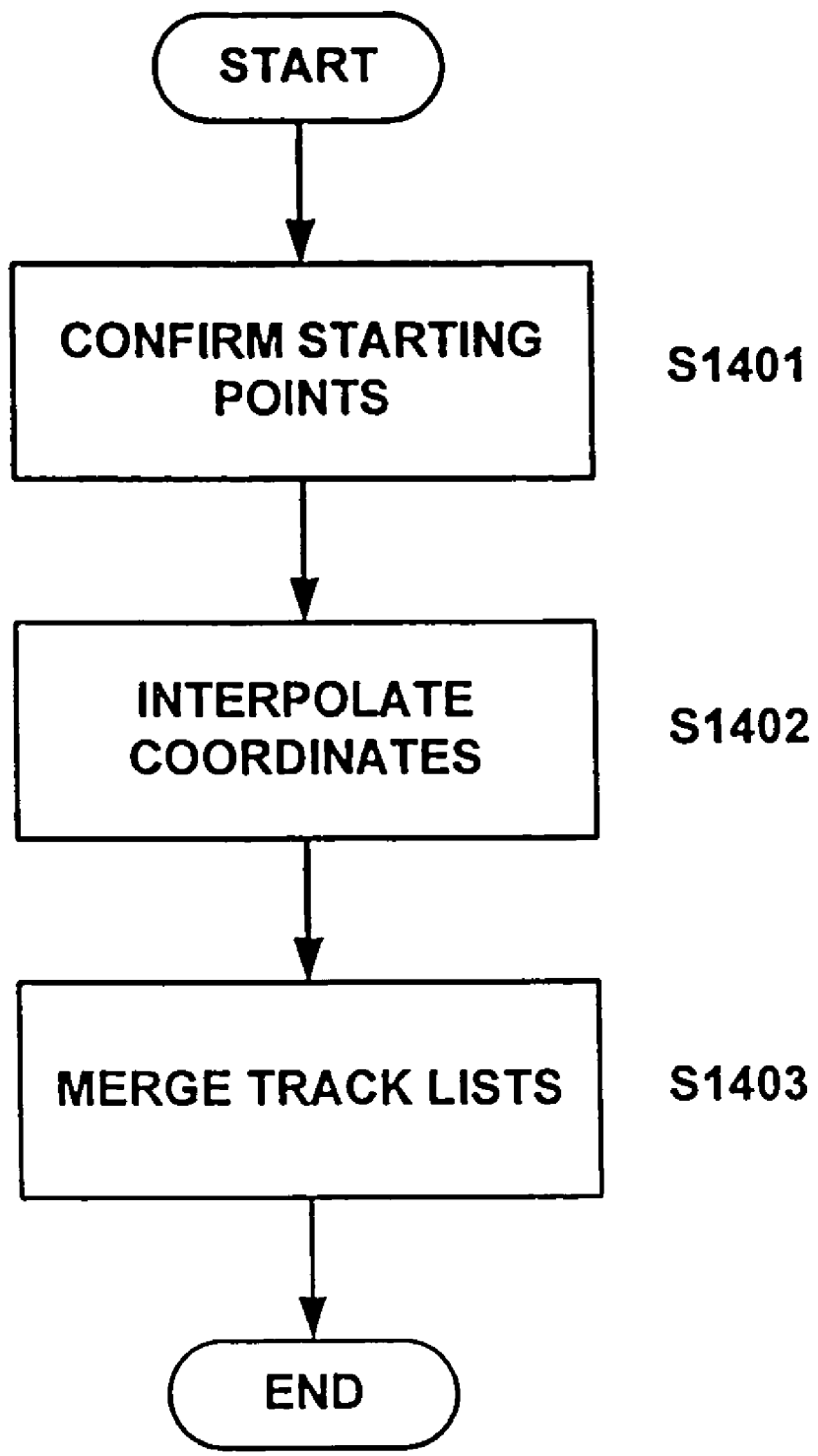
FIG. 14 is a flowchart depicting a process for merging corresponding track lists.

Once the starting points for the track lists in the x-y event list and the track lists in the y-z event list have been determined, the (x,y) coordinate data entries from the x-y event list are combined with the (y,z) coordinate entries from the y-z event list to form a single track list having (x,y,z) coordinates. FIG. 14 is a flowchart depicting a process for combining the track lists from the x-y event list with the corresponding track lists from the y-z event list.

Before combining the corresponding track lists, the starting points for the corresponding track lists are checked in step S1401 to see if they match. To confirm that the starting points match, the values for the common coordinates are compared. If the common coordinates in the two starting points are close to each other within a set threshold such as three coordinate values, the starting points of the tracks are confirmed. If the common coordinates of the two starting points are separated from each by more than the set threshold, the total light yield of the first halves of the two tracks is compared with the total light yield of the second halves of the tracks, and the endpoints of the halves having the lowest light yield are set as the starting points.

In step S1402, the missing coordinate in each of the data entries in the track lists is interpolated. Specifically, for each data entry in the x-y track list, the missing z coordinate value is interpolated using the z coordinate values from data entries in the associated y-z track list having y coordinate values near the y coordinate value of the data entry being interpolated. For each data entry in the y-z track list, the x coordinate value is interpolated using the x coordinate values from data entries in the associated x-y track list having y coordinate values near the y coordinate value of the data entry being interpolated. The two track lists, now having x, y and z coordinate values, are then merged using the order of the data entries based on their coordinates into a single track list in step S1403.

Returning to FIG. 12, once a single track list has been generated from the x-y track list and the y-z track list, the direction of initial travel for the recoil electron track is determined in step S1203. This determination is made using a linear least squares fit in the following manner.

For a particle traveling in a straight line with constant velocity u and starting at a point $r_0$, the position r at a time t is given by equation (1).

$$r = r_0 + ut \tag{1}$$

The vector u (or a vector proportional to it) is obtained by minimizing $\chi^2$ in equation (2) with respect to u, with $r_i$ being the $i^{th}$ point on the track list.

$$\chi^2 = \sum_i |r_i - (r_0 + ut_i)|^2 \tag{2}$$

With $t_i$ taken to be proportional to i, the minimization of $\chi^2$ produces u as shown in equation (3).

$$u = \frac{\sum_{i=1}^{N}(r_i - r_0)i}{\sum_{i=1}^{N} i^2} \quad (3)$$

In equation (3), satisfactory results are obtained when N is set to either a fixed number of 10 or 5+20% of the total number of data entries in the combined track list. The u obtained using equation (3) is then converted into a unit vector by dividing by its length, where the direction of u is determined to be the initial direction of the recoil electron. The uncertainty in each component of u is determined using straightforward error propagation from equation (3), assuming that the uncertainty in each measured coordinate is about half of the diameter of one fiber-optic scintillator 18.

Once the starting point and direction of a recoil electron track are determined, the energy of the recoil electron for each track is calculated in step S1204. To calculate the energies of individual recoil electrons, an energy calibration of detector 10 is performed to determine the average light yield per keV of electron energy. Using this ratio, the energy of a recoil electron is determined using the total amount of light recorded for the associated recoil electron track, which is obtained by adding the recorded light intensity yields for each of the data entries in the recoil electron track. The uncertainty in the energy of the recoil electron is computed assuming a Poisson distribution for the number of optical photons, which is determined based on the light intensity recorded by the photo sensor arrays, where the error in the number of optical photons is taken as the square root of the recorded number of photons.

Energy calibration can be performed either using simulation techniques or through actual testing of detector 10. Under the simulation approach, a distribution of light yields for a series of electron energies is generated using a Monte Carlo simulation. Using a Gaussian fit for the histogram of the distribution of light yields, a centroid for each peak in the distribution is determined and a linear least squares fit of the electron energy versus the respective centroids provides the average light yield for the respective electron energies.

One approach for performing energy calibration of the present invention through actual testing is to scatter gamma rays having a known energy from detector 10 and detect the resulting scattered gamma ray using a high-resolution detector such as a Ge crystal. Assuming a full photo peak event in the Ge detector, the energy of the recoil electron scattered in detector 10 is calculated as the known energy of the incident gamma ray less the energy detected by the Ge detector. Comparing this energy to the amount of scintillation light produced by detector 10 provides the average light yield.

In the foregoing manner, the recoil electron tracks for an event are reconstructed and defined by the energy of the recoil electrons, the starting points of the recoil electrons, the initial directions of the recoil electrons, and the uncertainties in the energy and direction of the recoil electrons.

Referring back to FIGS. 4A to 4C, an incident gamma ray with unknown momentum $p_\gamma$ Compton-scatters at a location $V_1$ in the detector producing a first recoil electron with momentum $p_{e1}$ and a Compton-scattered gamma ray γ' with momentum $p_{\gamma'}$. γ' proceeds to Compton-scatter at a location $V_2$ in the detector producing a second recoil electron with momentum $p_{e2}$ and a second Compton-scattered gamma ray γ" with momentum $p_{\gamma''}$. Assuming scattering from free electrons at rest, momentum and energy conservation laws dictate that at $V_1$ equations (3) and (4) shown below hold true.

$$p_\gamma = p_{e1} + p_{\gamma'} \quad (3)$$

$$E_\gamma = K_{e1} + E_{\gamma'} \quad (4)$$

In equation (4), $E_\gamma$ is the energy of the incident gamma ray γ and $K_{e1}$ is the kinetic energy of the first recoil electron. Similarly, at $V_2$ the momentum and energy conservation laws dictate that equations (5) and (6) shown below hold true.

$$p_{\gamma'} = p_{e2} + p_{\gamma''} \quad (5)$$

$$E_{\gamma'} = K_{e2} + E_{\gamma''} \quad (6)$$

In equation (6), $E_{\gamma'}$ is the energy of the first Compton-scattered gamma ray γ' and $K_{e2}$ is the kinetic energy of the second recoil electron.

The relativistic relation between the energy of the photon and the magnitude of its momentum is given by equation (7) shown below, $$E_\gamma = p_\gamma c \quad (7)$$

where c is the speed of light. The relativistic relation between the magnitude of the electron momentum and its kinetic energy is given by equation (8) shown below, $$p_e = \sqrt{\frac{K^2}{c^2} + 2mK} \quad (8)$$

where m is the mass of the electron.

Figure 15:
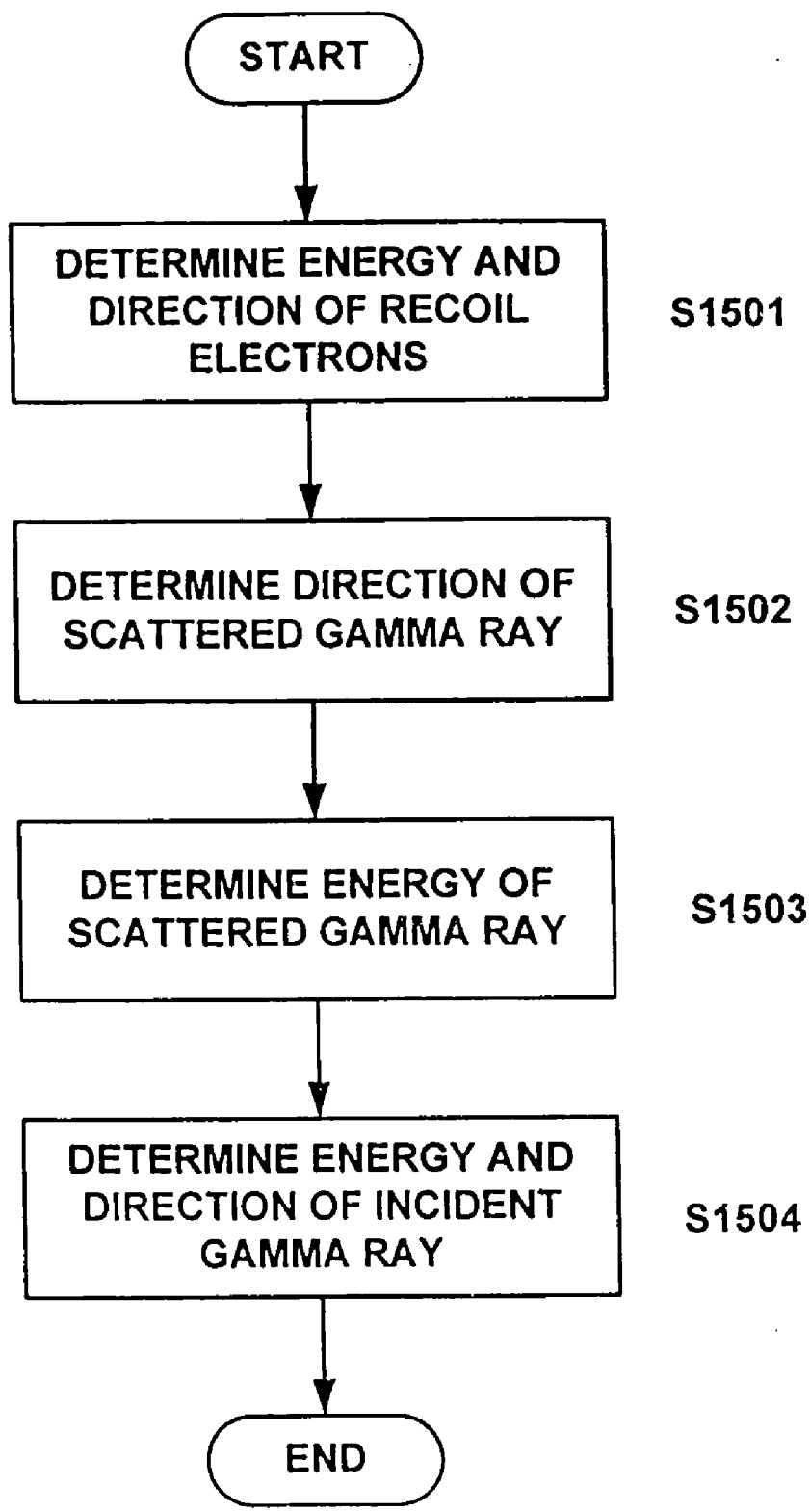
FIG. 15 is a flowchart depicting a process for reconstructing an incident gamma ray.

Using equations (3) to (8), the energy and direction of an incident gamma ray γ can be determined using the process depicted in the flowchart of FIG. 15. By determining the energy and direction of the recoil electrons (Step S1501) and determining the direction (Step S1502) and energy (Step S1503) of Compton-scattered gamma ray γ', the energy and direction of incident gamma ray γ is determined in the manner described in detail below.

As described above, the energy and direction of an incident gamma ray is determined based on the location, direction and energy of two recoil electrons produced through Compton-scattering of the incident gamma ray. Accordingly, those events which produce more or less than two recoil electrons are excluded from the gamma ray reconstruction processes described herein. However, one skilled in the art will recognize that the processes utilized by the present invention can be further developed to reconstruct gamma rays whose interactions with detector 10 produce more than two recoil electrons without departing from the scope of the invention.

Using equation (3) shown above, the momentum $p_\gamma$, from which the direction and energy of the gamma ray can be determined, can be calculated if the momentum $p_{e1}$ of the first recoil electron is known and the momentum $p_{\gamma'}$ is known. The direction of $p_{e1}$ is determined using the recoil electron track reconstruction process discussed above. The magnitude of $p_{e1}$ is determined using the recoil electron energy from the recoil electron track reconstruction process and equation (8) set forth above.

With respect to the momentum $p_{\gamma'}$ of the Compton-scattered gamma ray $\gamma'$, the direction is determined using starting points $V_1$ and $V_2$ of the first and second recoil electrons, respectively. The energy, together with the magnitude, of $p_{\gamma'}$ can be determined either by using the quantities at $V_1$ and the angle $\alpha$ shown in FIG. 4B, or by using the quantities at $V_2$ and the angle $\phi$ shown in FIG. 4C.

For example, squaring equation (3) produces equation (9).

$$p_\gamma^2 = p_{e1}^2 + p_{\gamma'}^2 + 2p_{e1}p_{\gamma'}\cos(\alpha) \tag{9}$$

Deriving $p_\gamma$ from equations (4) and (7) produces equation (10)

$$p_\gamma = \frac{E_\gamma}{c} = \frac{K_{e1} + E_{\gamma'}}{c} \tag{10}$$

Using $p_{e1}$ from equation (8) and $p_{\gamma'}$ from equation (7) produces equation (11).

$$(K_{e1}+E_{\gamma'})^2 = K_{e1}^2 + 2mc^2 K_{e1} + E_{\gamma'}^2 + 2\sqrt{K_{e1}^2 + 2mc^2 K_{e1}} E_{\gamma'} \cos(\alpha) \tag{11}$$

Rearranging equation (11) produces equation (12).

$$E_{\gamma'} = \frac{mc^2}{1 - \sqrt{1 + \frac{2mc^2}{K_{e1}}\cos(\alpha)}} \tag{12}$$

Similarly, using equations (5) and (6) to eliminate references to unknown quantities $p_{\gamma''}$ and $E_{\gamma''}$ produces an alternative equation (13) for $E_{\gamma'}$ in terms of $K_{e2}$ and $\phi$.

$$E_{\gamma'} = \frac{mc^2}{\sqrt{1 + \frac{2mc^2}{K_{e2}}\cos(\phi)} - 1} \tag{13}$$

Figure 16:
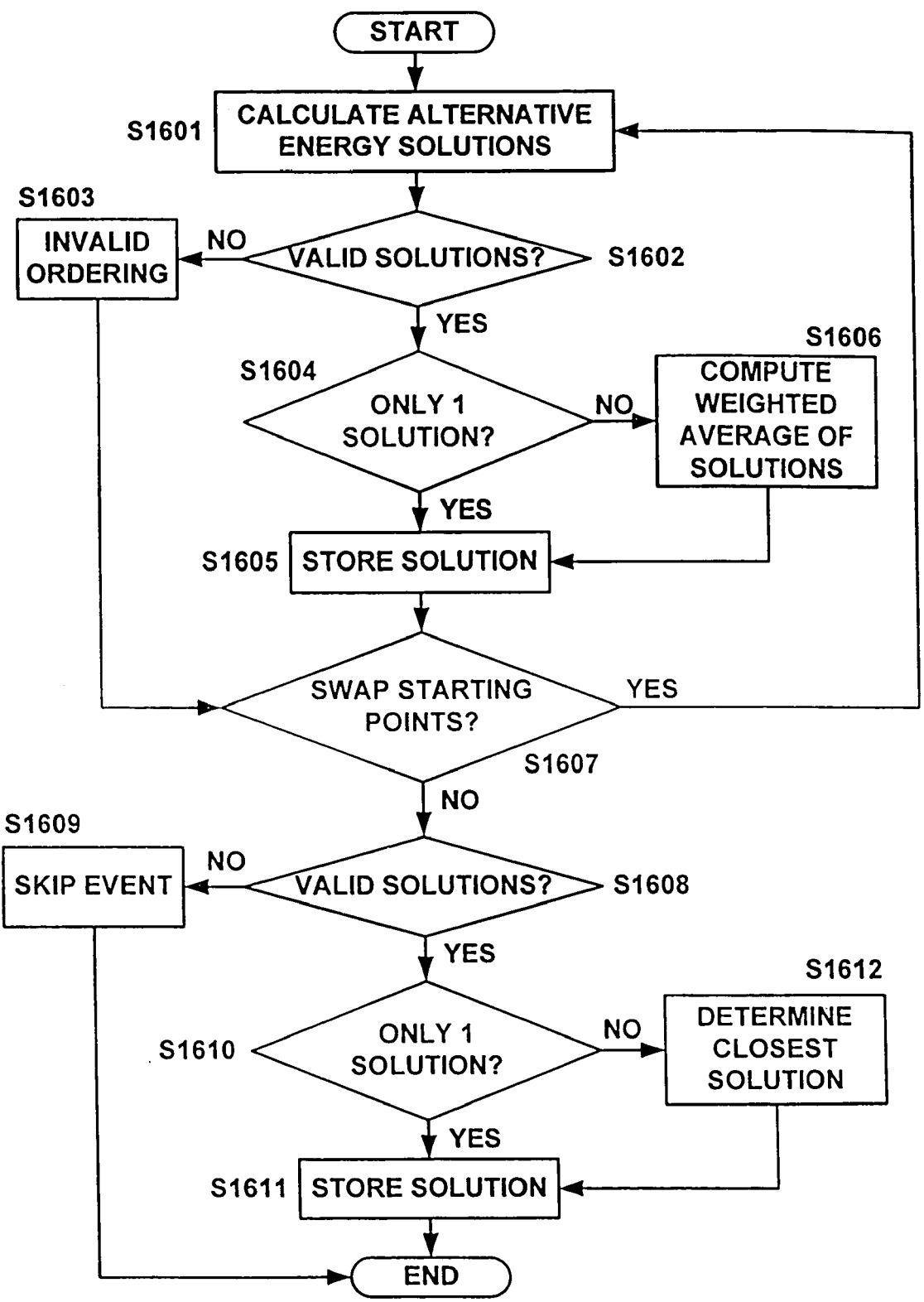
FIG. 16 is a flowchart depicting a process for determining the energy of a scattered gamma ray.

FIG. 16 is a flowchart depicting a process for determining the energy of Compton-scattered gamma ray $\gamma'$, which in turn can be used to determine the magnitude of momentum $p_{\gamma'}$. For each event, the process begins with two recoil electron tracks identified by a starting point $(x, y, z)_i$, energy $K_{ei}$, and direction unit vector $u_i$. The two recoil electron tracks are initially assigned to correspond to $V_1$ and $V_2$, respectively.

In step S1601, alternative energy solutions for $E_{\gamma'}$ are calculated using equations (12) and (13). To obtain a valid solution from equations (12) and (13), the denominator must be greater than zero. In step S1602, it is determined whether a valid solution is obtained from equations (12) or (13). If neither equation produces a valid result, the assigned ordering of the two recoil electron tracks to $V_1$ and $V_2$ is designated as an invalid ordering in step S1603 and the process jumps to step S1607. If a valid solution is obtained, it is determined in step S1604 if one or both of equations (12) and (13) produced a valid solution. If only one of equations (12) and (13) produced a valid solution, that solution is adopted in step S1605.

Alternatively, if both equations (12) and (13) produce a valid solution, a weighted average of the two solutions is obtained in step S1606 using equation (14).

$$\bar{E}_{\gamma'} = \frac{w^{(1)}E_{\gamma'}^{(1)} + w^{(2)}E_{\gamma'}^{(2)}}{w^{(1)} + w^{(2)}} \tag{14}$$

In equation (14), the superscripts (1) and (2) refer to the solutions obtained using equations (12) and (13), respectively. The weights defined in equation (15) shown below $$w^{(i)} = \frac{1}{(\sigma^{(i)})^2} \tag{15}$$

are obtained using the uncertainty $\sigma^{(1)}$ obtained with the error propagation in equation (16).

$$(\sigma^{(1)})^2 = \left(\frac{\partial E_{\gamma'}}{\partial K_{e1}}\right)^2 \sigma_{K_{e1}}^2 + \left(\frac{\partial E_{\gamma'}}{\partial \cos(\alpha)}\right)^2 \sigma_{\cos(\alpha)}^2 \tag{16}$$

The uncertainty $\sigma^{(2)}$ is obtained using equation (17).

$$(\sigma^{(2)})^2 = \left(\frac{\partial E_{\gamma'}}{\partial K_{e2}}\right)^2 \sigma_{K_{e2}}^2 + \left(\frac{\partial E_{\gamma'}}{\partial \cos(\phi)}\right)^2 \sigma_{\cos(\phi)}^2 \tag{17}$$

The uncertainties in the recoil electron kinetic energies are those obtained from the recoil electron track reconstruction, and the uncertainties for $\cos(\phi)$ and $\cos(\alpha)$ are computed from the error calculated on the recoil electron direction u. The weighted average is then adopted in step S1605.

The process of steps S1601 to S1606 is performed for each of the two possible orderings of the two recoil electron tracks of the event. For example, the recoil electron track initially assigned to $V_1$ is assigned to $V_2$, and vice versa. Accordingly, it is determined in step S1607 whether the assigned ordering of the recoil electron tracks has been switched by assigning the recoil electron track previously assigned to $V_1$ to now be assigned to $V_2$, and the recoil electron track previously assigned to $V_2$ to now be assigned to $V_1$. If the switch has not been performed, the assignments of the recoil electron tracks are switched and the process returns to step S1601. If the switch has already been performed, the process proceeds to step S1608 were the solutions obtained using the two ordering assignments of the recoil electron tracks are compared.

If neither ordering of the recoil electron tracks produces a valid solution, the event of the recoil electron tracks is skipped and no solution is adopted in step S1609. If at least one ordering of the recoil electron tracks produces a valid solution, it is determined in step S1610 if only one valid solution was obtained. If only one valid solution is obtained, that solution is adopted in step S1611. Alternatively, if two valid solutions are obtained, the solution that produces the closest agreement between the energy as computed from the magnitude of the momentum using equation (7) and as computed from energy conservation using equation (4) is adopted as the solution.

The final output from the gamma vector reconstruction step is the event number identifying which event has been processed, the energy of the incident gamma ray $\gamma$, the location $V_1$ of the first point of interaction with detector 10, and a unit vector in the direction of the momentum $p_\gamma$. By repeating the foregoing processes, an incident gamma ray for each recorded event that is reconstructable is reconstructed and the output information described above is stored by processor 14.

The output information from the present invention can be used in any of a number of ways for detecting a gamma source. For example, the output information can be used to control the movement of a video camera, thereby keeping the video camera pointed at the location of a gamma source. In this manner, a moving gamma source can be detected and tracked using one or more gamma vector cameras according to the present invention. The output information might further be used to overlay graphics on a video or still image captured by a camera aligned with the gamma vector camera. Alternatively, if the gamma vector camera is mounted on a moving vehicle such as a helicopter, the direction of the vehicle can be guided using the output information to lead the vehicle to a gamma source.

The invention has been described using particular illustrative embodiments. It is to be understood that the invention is not limited to the above-described embodiments and that various changes and modifications may be made by one skilled in the art without departing from the spirit and scope of the present invention.

What is claimed is:

1. A gamma vector camera for detecting and determining the energy and the direction of an incident gamma ray, said gamma vector camera comprising:
   a detector that produces scintillation light upon a first Compton-scattering of an incident gamma ray in said detector and upon a second Compton-scattering of the scattered gamma ray in said detector;
   a sensor for recording the locations and the intensities of the scintillation light produced by the first and second Compton-scatterings in said detector; and
   a processor for determining the energy and the direction of the incident gamma ray based on the locations and the intensities of the scintillation light recorded by said sensor.

2. The gamma vector camera according to claim 1, wherein said detector comprises a plurality of layers arranged on respective parallel planes, wherein each layer comprises a plurality of fiber-optic scintillators arranged parallel to each other on the plane of the layer in a direction orthogonal to the direction of the fiber-optic scintillators in adjacent layers.

3. The gamma vector camera according to claim 2, wherein said sensor comprises:
   a first photo sensor for recording the locations and the intensities of scintillation light produced by a plurality of the fiber-optic scintillators arranged in a first direction; and
   a second photo sensor for recording the locations and the intensities of scintillation light produced by a plurality of the fiber-optic scintillators arranged in a second direction orthogonal to the first direction.

4. The gamma vector camera according to claim 3, wherein said first photo sensor comprises a first photo sensor array having a plurality of elements in correspondence with the plurality of the fiber-optic scintillators from which said first photo sensor detects scintillation light, said second photo sensor comprises a second photo sensor array having a plurality of elements in correspondence with the plurality of the fiber-optic scintillators from which said second photo sensor detects scintillation light, and wherein the locations of the scintillation light are determined based on which elements of the first and second sensor arrays detect the scintillation light.

5. The gamma vector camera according to claim 4, wherein said sensor further comprises:
   a first fast sensor array corresponding to said first photo sensor, wherein said first fast sensor array comprises a plurality of elements with each element corresponding to a respective plurality of the elements of said first photo sensor array; and
   a second fast sensor array corresponding to said second photo sensor, wherein said second fast sensor array comprises a plurality of elements with each element corresponding to a respective plurality of the elements of said second photo sensor array,
   wherein in response to one of the plurality of fast sensor array elements detecting scintillation light in said detector, the locations and the intensities of the scintillation light are detected using the corresponding plurality of photo sensor array elements.

6. A gamma vector camera for detecting and determining the energy and the direction of an incident gamma ray, said gamma vector camera comprising:
   detection means for producing scintillation light upon a first Compton-scattering of an incident gamma ray in said detection means and upon a second Compton-scattering of the scattered gamma ray in said detection means;
   sensing means for detecting the location and the intensity of the scintillation light produced by the first and second Compton-scatterings in said detection means; and
   processing means for determining the energy and the direction of the incident gamma ray based on the location and the intensity of the scintillation light detected by said sensing means.

7. A method for detecting and determining the energy and the direction of an incident gamma ray, comprising the steps of:
   recording the locations and the intensities of scintillation light produced in a detector upon a first Compton-scattering of an incident gamma ray in the detector and upon a second Compton-scattering of the scattered gamma ray in the detector;
   determining the paths and the energies of a first recoil electron scattered in the detector by the incident gamma ray and a second recoil electron scattered in the detector by the scattered gamma ray using the locations and intensities of the scintillation light recorded in said recording step; and
   reconstructing the energy and the direction of the incident gamma ray using the paths and the energies of the first and second recoil electrons determined in said determining step.

8. The method according to claim 7, wherein the detector comprises a plurality of fiber-optic scintillators, and wherein for each of the fiber-optic scintillators that produces scintillation light, the location of the fiber-optic scintillator and the intensity of the scintillation light produced by the fiber-optic scintillator are recorded in said recording step.

9. The method according to claim 7, further comprising the step of reconstructing the energy and the direction of the scattered gamma ray using the paths and the energies of the first and second recoil electrons determined in said determining step,
   wherein the energy and the direction of the incident gamma ray is reconstructed using the path and the energy of the first recoil electron determined in said determining step and the energy and the direction of the scattered gamma ray.

10. A computer-readable medium which stores computer-executable process steps, the computer-executable process steps for determining the energy and the direction of an incident gamma ray, said computer-executable process steps comprising process steps executable to perform a method according to any one of claims 7 to 9.

11. Computer-executable process steps stored on a computer-readable medium, said computer-executable process steps for determining the energy and the direction of an incident gamma ray, said computer-executable process steps comprising process steps executable to perform a method according to any one of claims 7 to 9.

* * * * *

UNITED STATES PATENT AND TRADEMARK OFFICE
CERTIFICATE OF CORRECTION

PATENT NO. : 7,274,020 B1  Page 1 of 1
APPLICATION NO. : 10/866760
DATED : September 25, 2007
INVENTOR(S) : Hindi et al.

It is certified that error appears in the above-identified patent and that said Letters Patent is hereby corrected as shown below:

IN THE DRAWINGS

In Figure 6:

Reference Number "26" should read -- 22 --.
Reference Number "22" should read -- 20 --.

Signed and Sealed this

Twenty-fourth Day of March, 2009

JOHN DOLL
*Acting Director of the United States Patent and Trademark Office*